(12) United States Patent
Doty et al.

(10) Patent No.: US 12,673,754 B2
(45) Date of Patent: Jul. 7, 2026

(54) SEA MULTICOPTER

(71) Applicant: Doty Scientific, Inc., Columbia, SC (US)

(72) Inventors: F David Doty, Columbia, SC (US); Glenn N Doty, Columbia, SC (US)

(73) Assignee: Doty Scientific, Inc., Columbia, SC (US)

( * ) Notice: Subject to any disclaimer, the term of this patent is extended or adjusted under 35 U.S.C. 154(b) by 339 days.

(21) Appl. No.: 18/685,759

(22) PCT Filed: Oct. 23, 2022

(86) PCT No.: PCT/IB2022/060176
§ 371 (c)(1),
(2) Date: Feb. 22, 2024

(87) PCT Pub. No.: WO2023/037350
PCT Pub. Date: Mar. 16, 2023

(65) Prior Publication Data
US 2025/0128793 A1    Apr. 24, 2025

Related U.S. Application Data

(60) Provisional application No. 63/261,359, filed on Sep. 20, 2021, provisional application No. 63/261,234,
(Continued)

(51) Int. Cl.
| | |
|---|---|
| *B63B 35/00* | (2020.01) |
| *A01G 15/00* | (2006.01) |
| *B01F 33/502* | (2022.01) |

(52) U.S. Cl.
CPC .............. *B63B 35/00* (2013.01); *A01G 15/00* (2013.01); *B01F 33/502* (2022.01)

(58) Field of Classification Search
CPC ....... B63B 35/00; A01G 15/00; B01F 33/502; B01F 27/85; B01F 27/91; B01F 33/503
See application file for complete search history.

(56) References Cited

U.S. PATENT DOCUMENTS

| | | | | | |
|---|---|---|---|---|---|
| 2,889,795 | A | * | 6/1959 | Parks ................. | B63B 35/4413 |
| | | | | | 405/195.1 |
| 5,282,763 | A | * | 2/1994 | Dixon .................... | B63H 25/42 |
| | | | | | 114/151 |

(Continued)

FOREIGN PATENT DOCUMENTS

| | | | | |
|---|---|---|---|---|
| AU | 2008255182 A1 | * | 2/2010 | ............. F03B 13/12 |
| JP | 2017123809 A | | 7/2017 | |
| KR | 1020120071644 A | | 7/2012 | |

OTHER PUBLICATIONS

Montegut, et al. "Mixed layer depth over the global ocean: An examination of profile data and a profile-based climatology", J Geophys. Research vol. 109, C12003, 2004.
(Continued)

*Primary Examiner* — Brian Christopher Delrue
(74) *Attorney, Agent, or Firm* — Oppedahl Patent Law Firm LLC

(57)    ABSTRACT
A large nuclear-powered ship, such as a repurposed aircraft carrier or a large cargo ship, is outfitted with a plurality of large downward-directed subsurface mixer propellers secured on its sides and/or ends. The propellers are positioned below the bottom of the ship and have blade lengths in the range of 10-60 m. They are coupled to the ship's steam turbines by drive shafts and gearing compatible with the required propeller power and rotational rates, typically 25-150 MW per mixer propeller and with blade tip speeds typically around 40 m/s. They produce a large-diameter low-velocity downward plume of surface sea waters below the ship that induces upwelling of cold nutrient-rich deep
(Continued)

waters in areas where the cyclone genesis index is high. The downward mass-flow magnitude (typically 3-30 times the flow rate over Niagara Falls, but at only a few m/s) is on the scale needed for a small number of such ships to essentially end cyclone genesis in the Atlantic. At the same time, the induced upwelling of nutrient-rich deep waters is expected to lead to the newly mixed areas becoming highly productive fishing areas.

12 Claims, 5 Drawing Sheets

Related U.S. Application Data filed on Sep. 15, 2021, provisional application No. 63/261,145, filed on Sep. 13, 2021.

(56)                    References Cited

U.S. PATENT DOCUMENTS

| | | | | |
|---|---|---|---|---|
| 5,492,274 | A * | 2/1996 | Assaf | A01G 15/00 |
| | | | | 114/244 |
| 5,989,082 | A * | 11/1999 | Corliss | B63B 1/38 |
| | | | | 114/151 |
| 7,536,967 | B2 * | 5/2009 | Barber | E02B 1/003 |
| | | | | 114/151 |
| 7,798,419 | B2 * | 9/2010 | Solc | A01G 15/00 |
| | | | | 405/80 |
| 7,832,657 | B2 * | 11/2010 | Kitamura | A01K 63/065 |
| | | | | 210/170.11 |
| 8,262,314 | B2 * | 9/2012 | Sirovich | A01G 15/00 |
| | | | | 405/52 |
| 8,276,535 | B1 * | 10/2012 | Karem | B63B 35/50 |
| | | | | 114/261 |
| 8,685,254 | B2 * | 4/2014 | Bowers | E02B 1/003 |
| | | | | 60/641.1 |
| 9,624,917 | B2 * | 4/2017 | Orridge | F04B 17/02 |
| 9,736,996 | B2 * | 8/2017 | Rosen | B05B 12/12 |
| 10,822,060 | B1 * | 11/2020 | Montestruc | B63B 39/03 |
| 2007/0084767 | A1 * | 4/2007 | Barber | E02B 1/003 |
| | | | | 210/120 |
| 2007/0101921 | A1 * | 5/2007 | Goldschmidt | A01G 15/00 |
| | | | | 114/382 |
| 2010/0155499 | A1 * | 6/2010 | Gradle | A01G 15/00 |
| | | | | 239/14.1 |
| 2013/0042594 | A1 * | 2/2013 | Zauderer | H02K 44/085 |
| | | | | 60/218 |

OTHER PUBLICATIONS

Kerry Emanuel, "100 Years of Progress in Tropical Cyclone Research", Meterorological Monographs, vol. 59, 15.1-15.68, 2018.

Lobner P, Marine Nuclear Power, 2018, https://lynceans.org/wp-content/uploads/2018/07/Marine-Nuclear-Power-1939-2018_Part-2B_USA_surface-ships.pdf.

Liu M, Tanhua T, "Water masses in the Atlantic Ocean: characteristics and distributions", Ocean Science, 17, 463-486, 2021.

* cited by examiner

[Fig. 1]
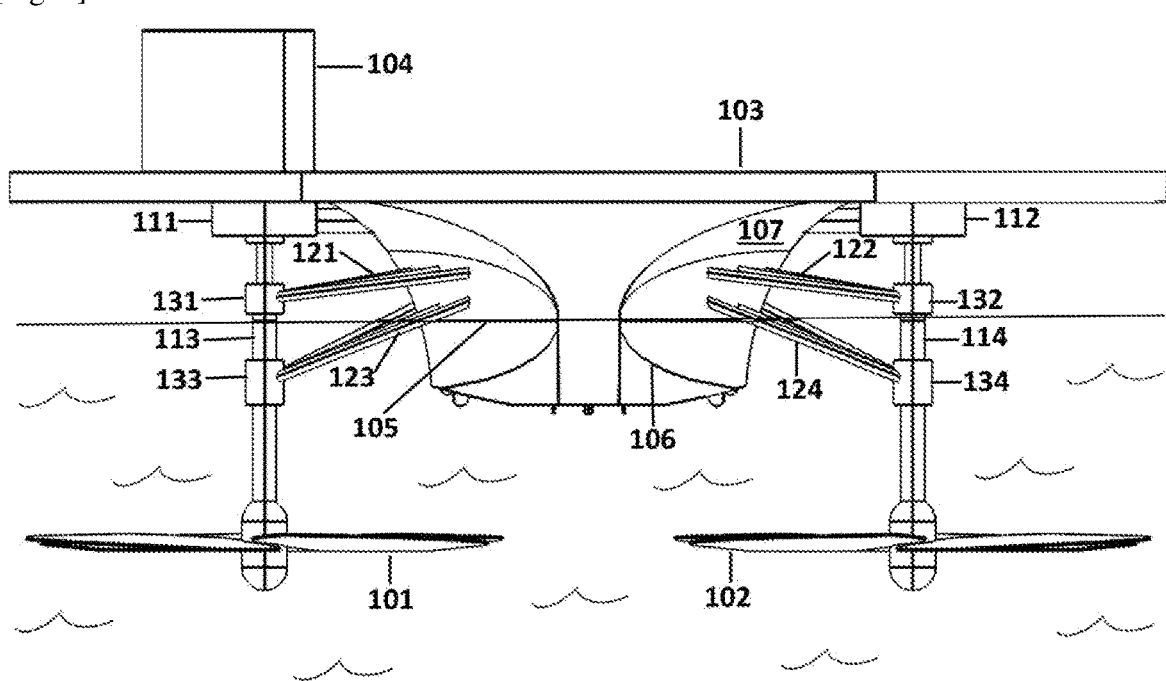
[Fig. 2]
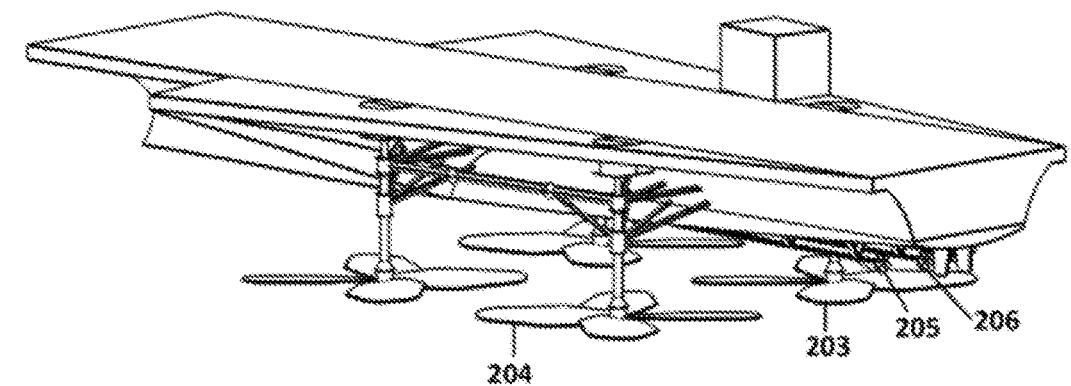

[Fig. 3]
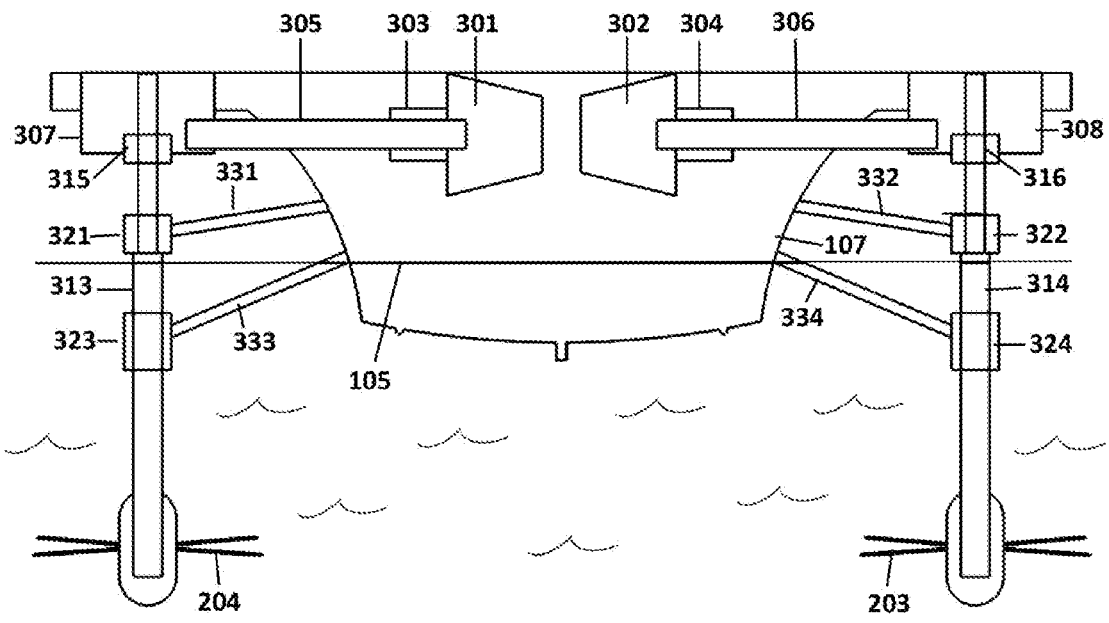
[Fig. 4]
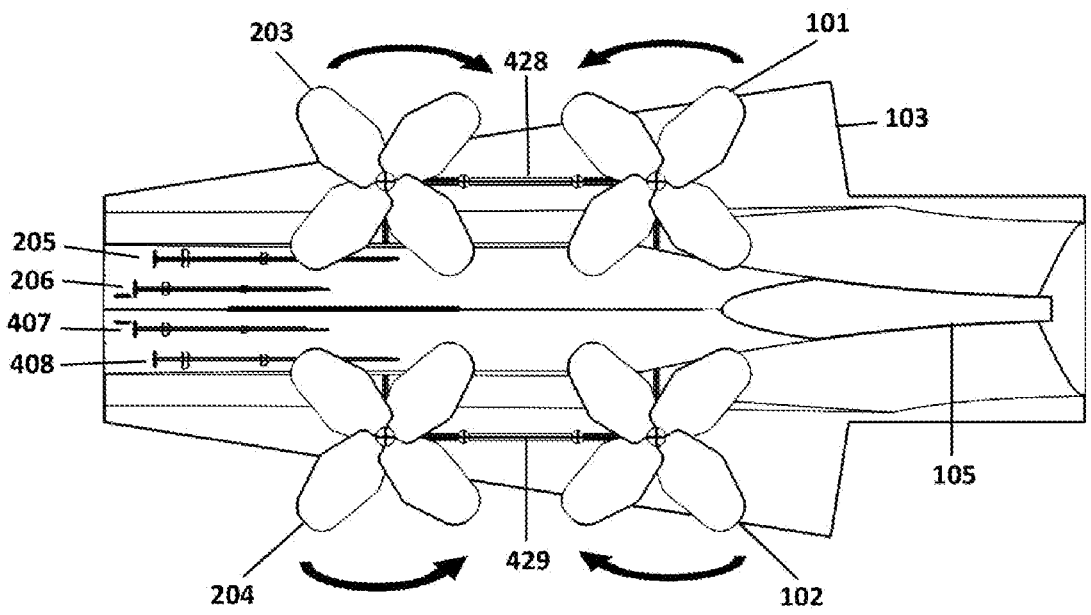

[Fig. 5]
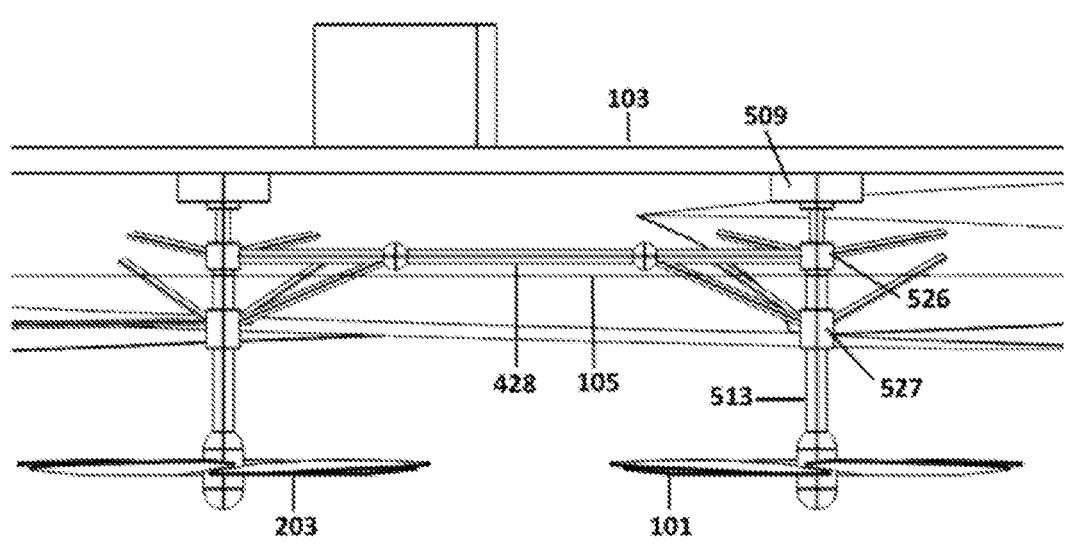

[Fig. 6]
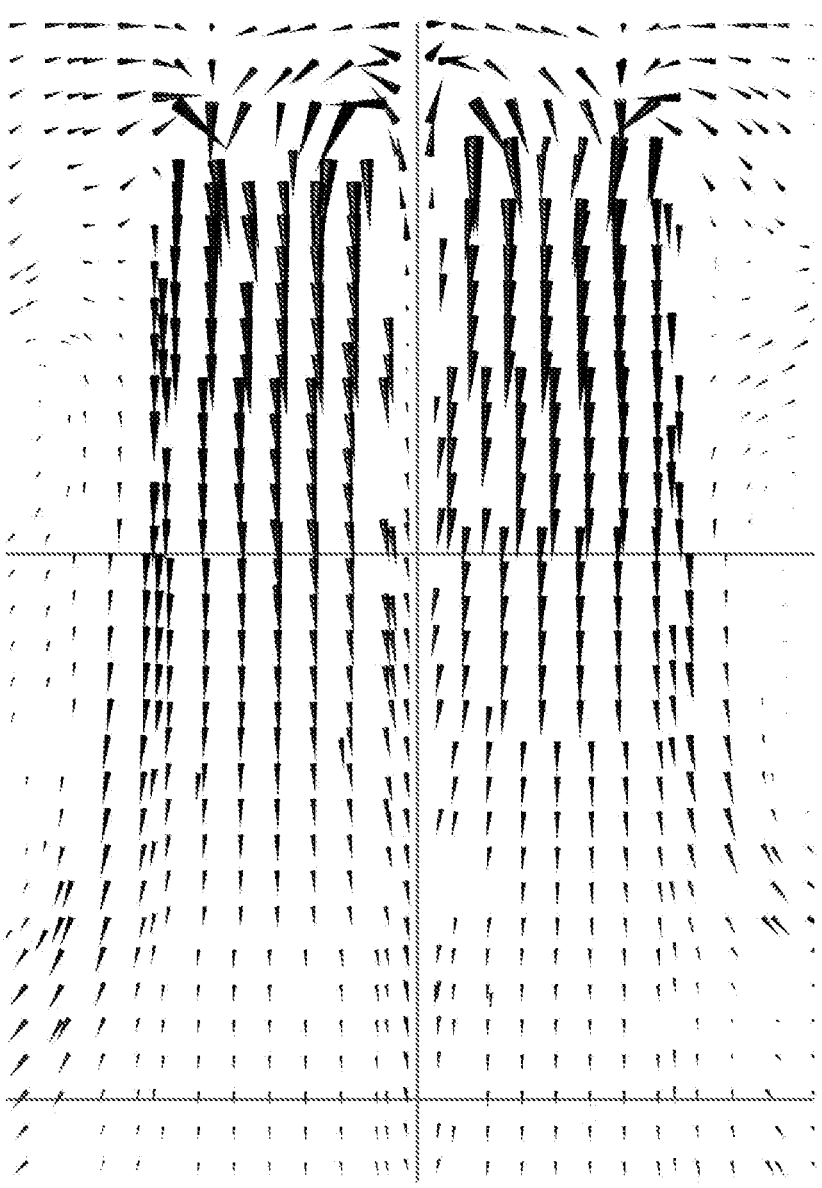

[Fig. 7]
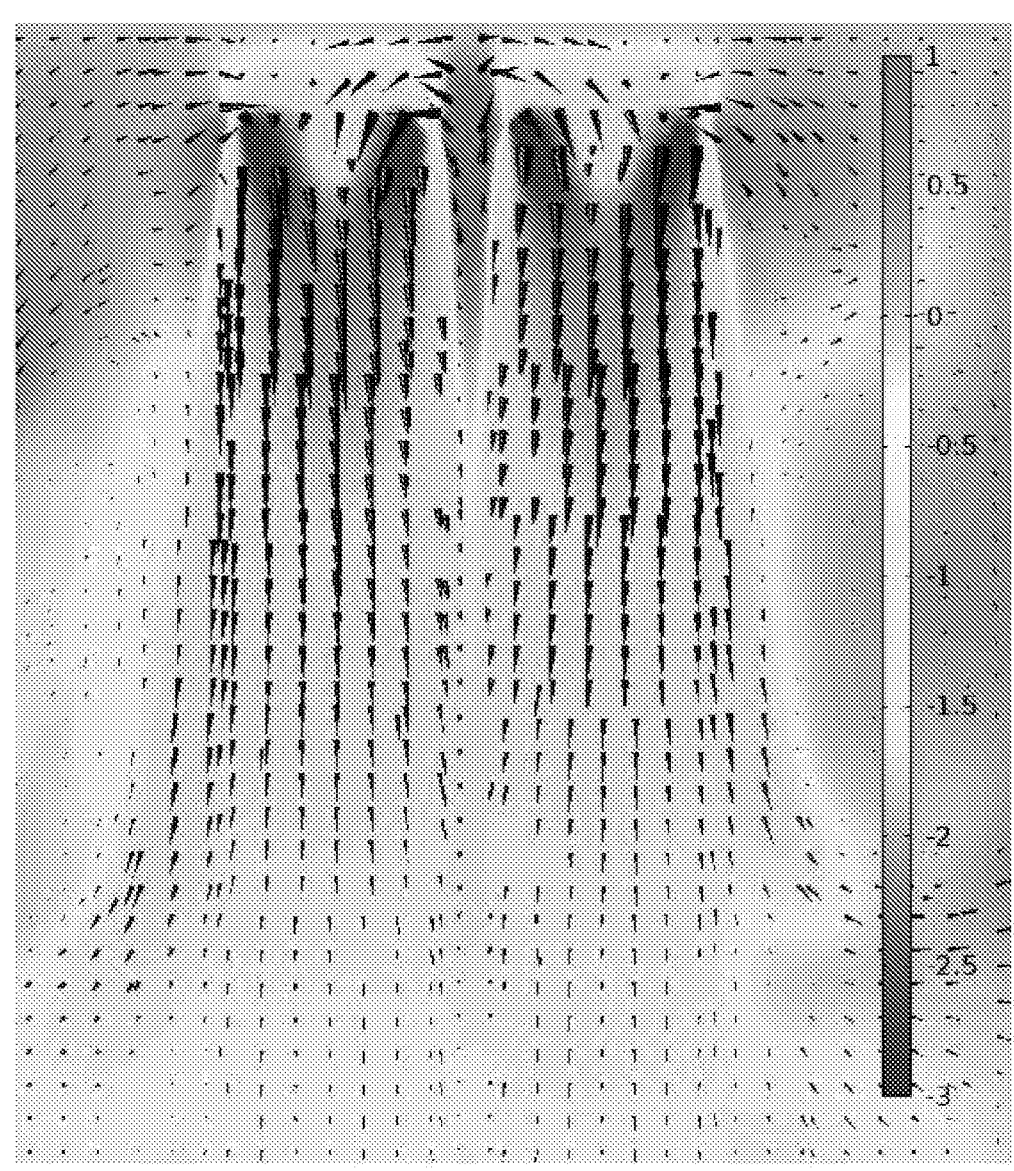

SEA MULTICOPTER

Priority application numbers U.S. 63/261,145, U.S. 63/261,234, and U.S. 63/261,359 are incorporated herein by reference.

TECHNICAL FIELD

The field of this invention relates generally to weather alteration. More specifically, the present invention relates to methods for reduction of cyclone genesis and for diminishing cyclone intensity by utilizing several large downward directed propellers driven by a nuclear-powered ship to generate a large downward directed plume of surface waters to stimulate deep upwelling and lateral convention currents in regions of the ocean with a high cyclone genesis index.

BACKGROUND ART

One of the more dramatic effects of climate change is the increase in mean intensity and economic impact of hurricanes, technically cyclones. To illustrate, the average of annual hurricane damages in the United States for 2017-2021 was over $130B/year. Hurricane Dorian, which devastated the Bahamas in 2019 left over 70,000 people homeless and killed 330. Hurricane Katrina caused over 1800 deaths and $125B in damage in 2005. Hurricane Maria demolished Puerto Rico and Dominica in 2017 with over 3050 fatalities.

Efforts over the past two decades by several first-rate research groups have attempted to devise a viable and practical approach to ending or taming hurricanes. No such prior effort progressed beyond the study and patenting phase, as it became clear that none of the proposed methods would be practical or effective. The instant invention is radically different from prior art in many respects, as will become clear. Perhaps most importantly, computational fluid dynamics simulations have shown that it will work, and that it appears to be two orders of magnitude more cost effective than the prior art.

General Background on Cyclones. Hurricanes begin as partial circular flows around depressions over warm seas, and if not disrupted they can slowly build into closed circular flows that become heat engines operating between the warm sea surface and the cool upper troposphere. Their intensification and maintenance against normal dissipative mechanisms depends exclusively on self-induced heat transfer from the ocean, which arises from the surface-wind-driven anomalous fluxes of moist enthalpy at the sea surface. The warm low-density moist air then drives an ascending central vortex that creates increasing atmospheric boundary-layer inflow and tangential flow from the Coriolis effect. The radial outflow at the top of the eye in the troposphere is radiatively cooled and dried. That flow then descends beyond (and within) the rain bands to complete the positive-feedback heat-engine loop. Tropical cyclones cannot build into the monsters they can become if they are not allowed to begin, and they can only begin if: (1) the sea surface temperature (SST, usually defined at a depth of 10 m) is above 26.5° C., (2) the relative humidity in the atmosphere in a large region from the sea surface to the mid troposphere (~5 km) is very high (above 80%), (3) there is low atmospheric shear to altitudes of at least the −20° C. isotherm (~7500 m), and (4) there is a sufficient level of cyclonic vorticity in the lower troposphere in the genesis region. In the Atlantic these conditions are rarely found except in late summer and early fall in several regions, particularly south of the Cape Verde Islands. Most of the destructive Atlantic cyclones begin from several relatively small regions in the tropical Atlantic between 11° N and 16° N.

Cyclone genesis can be prevented if the SST can be kept below 26° C., or if relative humidity from just above the atmospheric boundary layer up to the mid troposphere can be kept below ~80%. Prior efforts at hurricane taming have focused on trying to reduce SST by producing upwelling of deeper cool waters, but those methods were several orders of magnitude shy of what was needed to effect sufficient surface cooling over large areas of the ocean. In contrast, the instant invention enables that, and at a remarkably low cost.

Modeling and experimentation may reveal other means of using these sea mixers to more efficiently end cyclone genesis. One possibility may be that by extending sea surface cooling to certain areas where cyclone genesis is not particularly high, one could significantly reduce high altitude relative humidity—thereby lowering the cyclone genesis index of neighboring regions where SSTs are still quite high.

The Mixed Layer Depth (MLD). The MLD refers to the depth to which surface waters are mixed daily by wave action and thus are at nearly uniform temperature. We use the most common of the various definitions, the depth at which density has increased by 0.125 kg/m$^3$ relative to that at 10 m, or the temperature has decreased by 0.5° C. (U.S. Navy maps use 0.8° C., and others have used 0.1-1.0° C.) In the primary cyclone-spawning region—which we'll loosely call the "primary critical zone", 11-16° N, 18-28° W (550× 1100 km$^2$)—the mean August MLD (0.5° C.) is only about 20 m because winds there are often calm. The average MLD throughout the tropics is more than twice that.

Sea temperatures in this critical zone in August are typically approximately as follows: 20° C. at 35 m depth; 15° C. at 70 m; 10° C. at 400 m; 7.5° C. at 650 m; 5° C. at 1000 m; 3° C. at 2300 m, and the mean SST is 28° C. In March, these isotherms are at 50 m, 110 m, 350 m, 550 m, 1000 m, and 2200 m respectively, and mean SST is 25° C.

Prior Related Patents. In 2009 Barber was issued U.S. Pat. No. 7,536,967 for design of a system for pumping sea surface waters to deep below the surface through a large vertical pipe from a tank just below the surface moored to a ship. A wind turbine above the tank would provide power for the pumps. The patent contains no details or calculations, so we did a few. The largest available wind turbine (222-m dia.) can provide only 5 MW when the mean wind speed is only 8 m/s (at 150 m altitude, 300 K). If the pipe is 8 m in diameter, the Barber concept (with highly optimized pumps and manifolding) might be able to pump surface waters to 80 m depth (causing deeper waters to well up) at the rate of 2.4E5 kg/s. The total mass of water in the primary critical zone within the MLD is ~1.2E16 kg. So, it would take at least 500 such systems (ships, huge wind turbines, pumps, pipes . . . ) to pump about 30% of the water above the MLD in this critical zone down to the 15° C. isotherm in a year. In so doing it could reduce SST in this region by about 3° C., which would stop most cyclone genesis from there—at least for several years. One major problem (other than the cost of 500 such systems) is that the cooler surface waters now radiate less, so net annual heating (insolation minus long-wave radiation) is increased, and in about 5 years (with the fleet pumping continuously) the MLD would probably be extended to ~100 m. The SST then would slowly return to about where it was before, and cyclone genesis would return. And there are other issues to deal with, including up to 400 tonnes (t) of wind thrust on the 150-m-high wind tower, in seas 4000-m deep.

Kitamura was issued U.S. Pat. No. 7,832,657 in 2010 for essentially attaching eight 0.5-m-diameter pipes to a submarine-like platform to pump deep water up to the surface. He proposed to pump 400 kg/s through each of the pipes from a depth of 100-400 m to near the surface. Simple calculations show it would take ~40,000 such structures to cool the surface waters of the primary critical zone in a year.

In 2012 Sirovich was issued U.S. Pat. No. 8,262,314 for a method that would have a fleet of nuclear submarines towing turbulence-enhancing structures along the thermocline (the depth at which the thermal gradient is maximum, usually near the 20° C. isotherm in the tropics) ahead of the forecast path of a cyclone to enhance mixing of lower cool waters with surface waters. Perhaps the biggest problem with this idea is that the MLD quickly and naturally deepens ahead of cyclones—whipped up by the winds—often reaching depths exceeding 100 m. Increased turbulent mixing above the MLD would do nothing to reduce the SST. Moreover, the normal 20° C. isotherm is over 80 m deep in some places in the tropical ocean, and submarine-path-enhanced turbulence is unlikely to extend much more than 30 m above and below the path of the submarines.

Bowers et al (a team that included Bill Gates) were issued U.S. Pat. No. 8,685,254 in 2014 for a wave-driven method of pumping warm surface waters through a long pipe to below the 20° C. isotherm. The method includes a buoyant tube, waves reflecting off the ship to which it is moored, flap valves, a long pipe, and a power source for operating the valves. There were no meaningful calculations in any of the various patents from this group. We have seen one estimate that several hundred systems would be needed to reduce SST in the Gulf of Mexico (GOM) by several ° C. We suspect that was an optimistic estimate. Suffice it to say that each wave-driven pump would be huge, expensive, and likely unreliable, as there is no industrial experience with such.

In 2010 Solc was issued U.S. Pat. No. 7,798,419 for a ship-turbine-pump system that would track near the eyewall of a cyclone and use the wind power to spray cool sea water into the ascending air flow from a high floating tower. In 2017 U.S. Pat. No. 9,624,917 was issued to Orridge for a device powered by wind turbines for pumping up deep water and spraying it from tall floating towers into the eye of the cyclone. U.S. Pat. No. 9,736,996 was issued to Rosen in 2017 for sending a fleet of ships with immense snow-making refrigerators into the eye of the cyclone. These and several others do not merit further comment.

Our above analysis of the Barber method provides useful insights and a good starting point. Key to it achieving good efficiency was our assumption of the pipe being 8 m in diameter, thereby making it possible to pump 240 t/s with 5 MW—primarily because the water velocity in the pipe was under 5 m/s. With sufficient power, pumping surface waters down to 400 m or deeper could address the sustainability issue, as explained next.

Over time forced mixing to some depth causes the MLD to reach that depth, and SST in August slowly climbs if there is not sufficient upwelling or lateral convection. Currently the mean density in the primary critical zone from the surface to the 10° C. isotherm at 400 m depth is approximately 1024.5 kg/m³. If the temperature to 400 m depth is increased to a uniform 25° C., its mean density is reduced to ~1023.5 kg/m³. That is equivalent to a continuous atmospheric pressure change of ~4.5 kPa, which would assist in driving upwelling of deep cold waters (which are 7.5° C. at ~600 m) throughout the critical zone. More importantly, the horizontal density gradients (arising from the horizontal temperature gradients) surrounding the region of deepened MLD will drive lateral circulation currents—cool waters flowing into the region of deepened MLD at depths below 300 m and warmer surface waters above 100 m flowing outward. The central upwelling could keep the SST well below 26° C., as needed to end cyclone genesis in these areas.

Wind, however, isn't the best option for the needed power. At the mean wind speed in the primary critical zone (8 m/s, 29 km/hr) the thrust on a 150-m-high wind tower is "only" 150 t, but wind speeds may be much higher at times. In minimal gale-force winds (40 mph, 65 km/hr, 18 m/s) the total thrust will exceed 400 t even with maximum "feathering" of the pitch. That thrust could still be accommodated (assuming it is aligned with the ship) on a cargo ship of the common Handymax size (35,000-50,000 tonnes total). A bigger problem, however, is that the winds over much of the critical zones when needed most—in the summer—are often calm, under 3 m/s (11 km/hr). Clearly, wind turbines powering prior art approaches won't work from both economic and energy perspectives. Nuclear power, on the other hand, along with a radically different pumping approach, will economically do what is needed.

Nuclear power is no longer used for surface ship propulsion by most countries except for aircraft carriers, where it will continue to be standard fare because of its indisputable advantages for large ships with long missions. The Nimitz-class carriers, in production from 1975-2009, have two reactors generating the steam for four steam turbines which drive (through appropriate gearing) four propulsion propellers with a total shaft power of 194 MW. These ships are 333 m long, have overall width of 77 m (41 m at the waterline), 12 m draft, and displace 103,000 t. They will steadily be taken out of military service over the coming decades and replaced by Ford-class carriers, similar in dimensions but with about 260 MW of total output power and various warfare and communications advances. The first of the Nimitz-class, the USS Nimitz, has been scheduled to be decommissioned in 2025. The construction cost of the last Nimitz-class carrier was ~$6.2B, and much of that was for warfare features, armaments, storage facilities for ammunition and aviation fuels, and accommodating up to 6,000 soldiers. (For reference, it is worth noting that a 200 MW oil-fueled power plant would consume jet fuel at the rate of ~650 t/day.)

Only a few patents relevant to nuclear ship propulsion or its power usage have issued over the past three decades. U.S. Pat. No. 5,989,082, issued to Corliss in 1999, discloses the use of downward-directed jets of bubbles, steam, and water from the hull of a smaller nuclear-powered ship to assist in raising it from the displacement mode to the planing mode to reduce friction and drag for very high speed travel.

Additional Benefits of Deep Mixing. Most of the ocean has often been described as a desert because it is nearly devoid of marine productivity. Marine productivity begins with the phytoplankton, which require not just light and inorganic carbon, but also the nitrates, phosphates, silicates and other micronutrients that come mostly from upwellings of deep waters. Without the upwellings and inflow from rivers there would be almost no net primary production. About 25% of total marine fish catches come from five upwellings that occupy only 5% of the total ocean area. The upwellings that would come from the reduced mean density above 400 m in the newly mixed zones would feed the phytoplankton, which together with the mixing would oxygenate the waters at least down to the 1% light level (~300 m) and lead to them becoming highly productive fishing areas.

Ocean waters much below the MLD (presently a mere 20 m in the critical zones) have been steadily becoming more oxygen depleted, leading to massive die-offs in some regions. The deep mixing could extend the MLD in the critical zones ultimately to over 400 m, drive upwelling, and increase the depth at which there is sufficient oxygen to support diverse fish species by an order of magnitude in those regions. While some fish that happen to be directly in the path of the sea mixer will be killed, the benefits will far outweigh those minor losses.

Sinking organic particles constitute a primary source of energy for ocean ecosystems and a major mechanism for carbon sequestration in the deep ocean. While the larger organic particles (>100 μm) sink quickly (~100 m/day) they steadily fragment as they descend. Micron-sized particles sink 10,000 times slower (300 m in a decade) and represent one of the bottlenecks in the rate of $CO_2$ sequestration by the ocean.

The ocean's $CO_2$ uptake depends strongly on net primary production (which depends primarily on nutrients) and on the MLD. Ocean carbon uptake is a complex problem not yet fully understood. However, the upwelling of deep waters could increase surface uptake of $CO_2$ in the critical zones from current values of essentially zero to the 2 mole-$CO_2$/$m^2$/yr currently seen over parts of the sub-tropical south-western Pacific where SST is similar to what is expected in the critical zones after several years of sea-surface mixing. The effect of deep mixing in hurricane-spawning zones on thermohaline circulation is as of yet unknown but probably negligible.

SUMMARY OF INVENTION

A large nuclear-powered ship, such as a repurposed aircraft carrier or a large cargo ship, is outfitted with a plurality of large downward-directed subsurface mixer propellers secured on its sides and/or ends. The propellers are positioned below the bottom of the ship and have blade lengths in the range of 10-60 m. They are coupled to the ship's steam turbines by drive shafts and gearing compatible with the required propeller power and rotational rates, typically 25-150 MW per mixer propeller and with blade tip speeds typically around 40 m/s. They produce a large-diameter low-velocity downward plume of surface sea waters below the ship that induces upwelling of cold nutrient-rich deep waters in areas where the cyclone genesis index is high. The downward mass-flow magnitude (typically 3-30 times the flow rate over Niagara Falls, but at only a few m/s) is on the scale needed for a small number of such ships to essentially end cyclone genesis in the Atlantic. At the same time, the induced upwelling of nutrient-rich deep waters is expected to lead to the newly mixed areas becoming highly productive fishing areas.

BRIEF DESCRIPTION OF DRAWINGS

FIG. 1 is a front (bow) external view of a sea-mixer ship.

FIG. 2 is a perspective view of a sea-mixer ship from the upper stern-port-side direction.

FIG. 3 is a mixer drive-train cross section schematic drawing viewed from the rear.

FIG. 4 is a bottom external view of a sea-mixer ship.

FIG. 5 is a starboard-side external view of a sea-mixer ship.

FIG. 6 shows flow vectors from a CFD simulation of 80-m sea mixer propellers.

FIG. 7 shows z-component of flow velocity from the same CFD simulation.

DETAILED DESCRIPTION

The ultimate objective is to drive an enormous plume (or jet) of warm surface waters to depths of 300-500 m as efficiently as possible. ("Jet" would be the normal term, but that doesn't seem quite right for a multi-stream flow at only 2-3 m/s.) There are two keys to achieving this: (1) The mean plume velocity a short distance below the propellers should not be much more than needed (a few m/s) to balance the buoyancy head of a 400-m column of surface water in the sea's mean density over the 400-m depth, and (2) the plume's mean diameter at 100-m depth should preferably be at least 100 m. Achieving this requires total downward propeller shaft power of 100-800 MW, depending primarily on the ship's cruising speed, the MLD, and the desired sea penetration depth.

FIG. 1 is a front (bow) external view of an exemplary four-propeller (or sea quadcopter) conceptual model. In it one immediately sees the two large downward-directed front mixer propellers 101, 102 along with outlines of the main external features of an exemplary nuclear-powered ship. It would typically be a repurposed aircraft carrier and is partially characterized by a flight deck 103 and control tower 104. The typical waterline 105 is seen, along with typical contours 106 on the hull 107 of the ship. Speed-reduction gear boxes 111, 112 are seen driving high-torque vertical drive shafts 113, 114. Some of the beams 121, 122, 123, 124 securing front middle bearings 131, 132 and front lower bearings 133, 134 are seen.

In the upper stern-port-direction perspective view of [FIG. 2] the two downward-directed rear mixer propellers 203, 204 can be seen along with some other features. Again, for emphasis, to produce a downward plume of very high mass-flow rate as efficiently as possible, the flow velocity leaving the propellers should be no more than needed to balance buoyancy and viscous factors, the latter of which are extremely low and the former of which are very low at least to the depth of the MLD. To that end, the plume's mean initial flow velocity need only be 2-3 m/s. To achieve meaningful flow rates, the mixer propellers must have diameter greater than 20 m, more typically closer to 70 m, and possibly as large as 120 m. The figures help to convey some approximate typical relative dimensions.

For reference, the four prior art propulsion propellers on Nimitz-class carriers have diameter 7.6 m and mass of 30 t. Two propulsion propellers 205, 206 can also be seen in [FIG. 2], but they are more clearly visible in a later figure.

[FIG. 3] is a mixer drive-train schematic drawing viewed from the rear (stern) of the ship. It illustrates how two steam turbines 301, 302 could be coupled to the two rear mixer propellers 203, 204 by clutches 303, 304, high-speed drive shafts 305, 306, speed-reduction gear boxes 307, 308, and high-torque vertical drive shafts 313, 314. In practice, it may not be convenient to position the steam turbines in direct alignment with speed-reduction gear boxes at the tops of the vertical high-torque drive shafts as shown in this schematic-type drawing. The drive trains could be much more complex than shown, including additional turns, drive shafts, support bearings, and speed reduction gears according to the prior art.

The speed-reduction gear boxes 307, 308 would naturally include bearings 315, 316 on the high-torque shaft leaving it, according to standard practice. The vertical drive shafts 313, 314 would additionally be supported at least by lower bearings 323, 324 and preferably also by middle bearings 321, 322, particularly if the distance from the lower bearings to the mixer propellers exceeds 5 m. Similar turbines, clutches, drive shafts, gear boxes, bearings, and support structure for the two front mixer propellers 101, 102 are also present in the ship but not seen in this cross-section. Some of those items can be seen in other figures, though perhaps not specifically referenced by designators. The gear boxes would be secured to the flight deck, possibly below its flight surface. The middle and lower bearings would be secured to the ship by suitable support structure, such as seen in support beams 331, 332, 333, 334. The locations at which the support beams are connected to the ship's hull 107 may need to be strengthened by additional beams along its surface intersecting those locations in accordance with standard engineering practice. Additional support beams to the middle and lower bearings as seen in other figures are also required for sufficient support and rigidity of the bearing bushings in accordance with standard engineering practice. The results from some relevant exemplary mechanical design calculations are mentioned in a subsequent section for perspective purposes.

The ship could have a different number of mixer propellers on each side other than two as shown in the exemplary embodiment illustrated in the figures. A mixer ship could even have an odd number of downward directed mixer propellers of different sizes, and it could have one off the bow and/or one off the stern. The mixer propellers would each have their own respective drive trains. Electric motors could be used in place of steam turbines to drive some or all of the high-speed drive shafts. That is probably not the preferred approach, as in addition to requiring a substantial upgrade in the ship's electrical power generators, the motors and their required power conditioning systems add substantial mass and cost. However, using electric motors could permit significant simplifications in the drive trains to the high-torque gear boxes.

Usually there would be multiple reactors for producing the needed steam, according to the prior art. The components associated with a nuclear power plant, according to the prior art, are not shown.

For practical coupling of the required power to the propellers, the high-speed drive shafts would operate at rotational rate typically 20 to 200 times higher than that of the propellers. The required high-torque gear boxes may push gear technology somewhat beyond prior industrial experience. However, that would essentially be just a matter of larger planetary and bevel gears than seen in the nacelles of the largest wind turbines, where torques can exceed 2E7 Nm, which is two orders of magnitude beyond the torques seen in the axles of large tractors and an order of magnitude beyond the total torques seen in the wheels of large locomotive engines.

To permit operation of the sea mixer propellers at practical torques, the mixer propellers would preferably have low relative pitch compared to what is typically seen in boat or ship propulsion propellers. Mean pitch is normally defined as that at 75% of the propeller radius. Relative pitch is defined as the ratio of mean pitch to propeller diameter. Propulsion propellers typically have relative pitch in the range of 0.5 to 1.5, depending on the expected typical cruising speed and wake fraction of the vessel as well as motor power and gearing design.

The mixer propellers should preferably have relative pitch in the range of 0.1 to 0.5 to permit operation at powers in the 25-150 MW range with torques preferably not much more than several times those seen in the largest currently available wind turbines. Hence, they may operate at higher relative tip speed (ratio of tip speed to the mean stream velocity leaving the propeller) than normally seen in ship propellers. Maximum tip speed of the mixer propellers may typically be about 40 m/s, but it may be as high as 100 m/s to facilitate the use of gear boxes with output shaft torque similar to that seen in the largest wind turbines. The typical 70-m propellers may normally operate in the 7-14 rpm range, though blades with lower relative pitch could operate at higher rpm to facilitate operation at lower torque. The mixer propellers would also likely have lower blade solidity (defined as the ratio of blade area to total swept area) than typically seen in propulsion propellers, primarily to reduce mass so that mounting and dismounting are more manageable. This is desirable because the mixer ships would not be able to enter most ports or drydocks with their mixer propellers mounted. The lower solidity also helps improve efficiency in propellers operating at high relative tip speed.

The mixer propellers, and some portion of the vertical drive shafts (and possibly the lower bearings and some portion of the support structure) may need to be mounted in a special sea-mixer service platform offshore in deeper waters after leaving drydock. Before returning to drydock or a normal port they would need to be dismounted at an offshore service platform. This could be a rather complex operation not to be undertaken any more often than necessary. Of course, the ship's mixer propellers could be damaged from encountering an unexpected obstacle. The mixer ship would then need to return to a sea-mixer service platform for propeller replacement.

It should be noted that the mixer ships would employ multiple methods to minimize encounters with whales, dolphins, sharks, and large sea turtles. A scout ship would go ahead of the sea mixer ship to assist in advance detection and diversion of large sea animals. Sonar could be used to detect such and to possibly cause them to swim away. The sea mixer ship could decelerate and otherwise adjust its course if necessary. If a collision with a large or endangered animal appeared imminent, the sea mixer could quickly power down the mixer propellers.

The mixer ship needs to have a landing deck at least sufficient to accommodate large helicopters so that it may not need to re-enter port for many years. Having the landing deck large enough (as on aircraft carriers) to accommodate small winged aircraft, such as light dual-engine turbo-props, is highly desirable, as it would permit faster transport of staff from the ship to a more distant hospital in the case of an emergency.

From the combination of lower relative pitch and lower solidity than generally seen in ship propellers, the mixer propellers may operate with somewhat lower propeller efficiency than typical of propulsion propellers. Their blade optimization would likely come from CFD simulations in concert with system optimization, and they may look somewhat like a cross between those seen on trolling boats and those found in quadcopter drones.

When 70-m 40-MW mixer propellers power up, the load on the ship from the propellers, their drives, and support structures changes from perhaps 8,000 tons to probably a net upward force equivalent to perhaps 2000 t, and the ship rises accordingly—perhaps causing a 10% reduction in its displacement. If a mixer propeller fails during operation (from encountering an obstacle, or from some drive component failure) the load on the ship quickly becomes quite asymmetric—to the point of causing the ship to slowly begin to roll. (Carriers, because of their width, have enormous moment of inertia about the longitudinal axis as well as the other axes). To stop this slow roll before it possibly becomes an unacceptable list (tilt), the ship's stability control system, some portion of which could be located in the control tower 104, would quickly power-down all the turbines, possibly by reversing the direction of the steam flows to them, as sometimes done in these ships for rapid deceleration or quick maneuvers. (Steam is supplied separately from the reactors to additional steam turbines in these ships for electrical power generation to keep it independent of propulsion.)

The clutches in the mixer propeller drive trains could be designed as controllable slip clutches that limit peak torques in the drive train components in the event of an abrupt impact to prevent or limit damage to various components (including the steam turbines) and to safely dissipate large amounts of stored energy (in the angular momentum of the various components) when necessary. The stability control system could adjust steam as needed to functioning propellers to quickly return the ship to normal attitude and stability. The ability to control the power independently to the various mixer propellers gives the ship the stability of a trimaran, should the need ever arise in high seas. While the torques and forces from the mixer propellers would be high and the downward currents all around the ship would be rather high, they would be steady. With suitable control, the stability of the 110,000 t mixer ship should be similar to what is typical for aircraft carriers in moderate seas.

While the sea-mixer ship would never navigate waters even close to the depth of the propellers and would be equipped with the sonar and radar, a scout ship would still always go ahead of the mixer ship to insure there was no obstacle in the path of the ship (such as a sunken ship standing on end in relatively shallow waters). Additional layers of protective measures would be included. Shear pins and hinges at several locations along the lengths of the mixer propeller blades could limit damage from some impacts. Shear pins in the connections of the support structures to the bearings and to the ship could prevent major structural damage to the ship in the highly improbably event of a direct hard encounter of a mixer hub with a massive obstacle, such as an abandoned oil rig, for example.

The four mixer propellers 101, 102, 203, 204 are seen in the bottom external view of a sea-mixer ship illustrated in [FIG. 4]. The four propulsion propellers 205, 206, 407, 408 according to the prior art are shown approximately as they may be positioned on an aircraft carrier. The typical waterline 105 is seen around the portion of the hull that is normally submerged. The flight deck 103 viewed from the bottom is shown. Longitudinal beams 428, 429 between the adjacent lower bearings assist in providing the needed support stiffness.

The arrows near the mixer propellers in [FIG. 4] indicate possible rotational directions of the propellers, which here have alternate clockwise/counterclockwise directions so that the net torque on the ship from driving the mixer propellers is very small and easily within the normal azimuth control ability of the ship by its propulsion propellers and rudder. Another way of saying this is that the net torque driving the vertical drive shafts is much less than the largest torque applied to any single mixer propeller, where net torque is defined as the sum of the torque magnitudes applied in the clockwise direction minus the sum of the torque magnitudes applied in the counterclockwise direction.

In the central starboard-side view of [FIG. 5], mixer propeller 101 and some of its associated drive train, including gear box 509, vertical drive shaft extension 513, middle bearing 526, lower bearing 527, and some additional stiffening beams, come into view.

[FIG. 6] shows flow field with cone lengths proportional to velocity from a steady-state computational fluid dynamics (CFD) simulation (using commercial CFD software) of a model similar to that described in the previous figures and in a subsequent specific example. The results shown are from a yz plane a short distance in front of the two rear mixer propellers, in which the coordinate system has the x direction along the length of the ship and the z direction is perpendicular to the sea surface. The horizontal grid lines shown are at depths of 200 m and 400 m. The propellers here are 80-m diameter and of a simple non-optimized four-blade design, 40-m below the surface, operating at 11 rpm in sea water of nearly uniform temperature. [FIG. 7] is from the same simulation and plane as [FIG. 6] but here the z-component of the flow velocity is superimposed on the flow-vector plot as a rainbow color plot, with red at +1 m/s and dark blue clamped at −3 m/s, as seen in the color scale. The bottom of the plot shown is at a depth of ~420 m, and Vz there is still negative.

The CFD results show that four large low-pitch propellers can send a 2-3 m/s plume of surface waters down to below 400 m after the MLD is nearly that deep. The CFD simulation confirms the validity of the concept—that a practical amount of ship power (100-600 MW) can drive the needed mass-flow magnitude so that a small number of nuclear sea-mixer ships can essentially end cyclone genesis in the Atlantic. Propeller calculations indicated that with optimized 70-m propeller blades, 50 MW per propeller would produce a downward plume of over 40,000 t/s at a somewhat lower velocity. That is about 10 times the flowrate over Niagara Falls and 100,000 times the flowrate per pipe proposed by Kitamura in U.S. Pat. No. 7,832,657.

When the mixer propellers are operating there would be inward directed currents (~1 m/s) all around the ship toward its hull, where they turn downward and accelerate. Hence, for safety reasons, it will be important to have a secure fence to at least shoulder height surrounding all exposed decks, as rescue of any person that might go overboard into the sea (for example, if on deck during a storm) would be improbable. It would be standard operating procedure to have the mixer propellers (and probably the propulsion propellers) shut down during aircraft landings and take-offs to make rescue possible in the event of an accident. It might be desirable to have a safety net surrounding the carrier as an extra and obvious safety measure, if only to reduce stress levels in crew members that might be on deck while the mixer propellers are operating.

Additional Mechanical Design Issues. It is instructive to provide some additional information on closest relevant prior art in high-torque speed-reduction gear boxes. The nacelles of 15 MW wind turbines have mass approximately 600 t. The mass of the gears, bearings, shafts, and bushings comprise about two-thirds of that, and it scales approximately linearly with maximum power Pw in wind turbines, while maximum hub rpm scales approximately as $1/Pw^{0.33}$ and is ~8 rpm at 15 MW. A rough estimate is that the mass of a 45 MW gear box for a 12 rpm sea-mixer propeller would be ~600 t. It would likely use the largest spherical roller bearings readily available on the high-torque shaft, and the upper bearing on the vertical drive shaft would be integrated within the gear box. These bearings may have 1.2 m bore and dynamic load limits above 3E7 N. The maximum shear stress in a solid shaft of 1.2 m diameter at 50 MW, 12 rpm, 4E7 Nm, would be under 120 MPa, which is under 20% of the yield strength in some high-strength low-alloy (HSLA) steels used, for example, in some large cranes. The shaft between the upper and middle bearings on the vertical drive shaft would likely be a tube of diameter larger than that of the bearing bore, as that permits lower mass, higher stiffness, and higher mode frequencies. If this shaft OD is 2 m with 1.8 m ID, the maximum shear stress in it at 4E7 Nm torque would be ~75 MPa, which is a factor of 4 below yield strength in SS316L, an alloy that has high corrosion resistance to sea water. If portions of the vertical drive shafts are enclosed within tubes that keep them dry, a less expensive HSLA steel would be used for the dry portions of the drive shafts. Such enclosure tubes with suitable seals could readily be incorporated between the gear boxes and the lower bearings, and they could extend for some distance below the lower bearings with appropriate dynamic seals on the shafts, by common methods. HSLA steels with protective coatings could also be used for other components exposed to the sea (except most of the mixer blades), as is common practice in ship building and offshore applications.

The bearings in the gear box would likely be of the spherical roller bearing type because the high torques in the gears lead to high bearing loads and precision meshing of the gears needs to be maintained over a long service lifetime for low vibration and wear. However, the bearing loads will be much lower in the middle and lower bearings. Hence, these could be of the simpler journal type, which can be over 3 m diameter without going beyond available manufacturing capabilities. The bearing PV product (the produce of bearing pressure in MPa and velocity in m/s) would normally be under 1 MPa-m/s (which is not very high by bearing standards) but pumped oil lubrication, as is common practice, would be needed for adequate service lifetime. Having sealed enclosure tubes from the gear boxes to below the lower bearings helps to facilitate this.

If the propellers are operating at 12 rpm and have 4 blades, the primary excitation frequency on their shafts from interactions with neighboring blades and with the hull would be 0.8 Hz. That is far below the lowest mode (free-free, or pivot support at both ends) for the above tubular drive shaft, which would be ~30 Hz for 2 m OD, 0.1 m wall, and 20 m between two bearings.

It is also useful to provide some information on what are probably the largest ship propellers currently in use. The Triple-E class container ships (~200 kt fully loaded) are driven by two propellers of ~10 m diameter, mass ~70 t, and each driven by ~30 MW at 73 rpm at top speed (~46 km/hr). Here, the propeller tip speed would be 38 m/s and the torque would be 4E6 Nm. For comparison, the mass of the blades in a 15 MW wind turbine (220 m diameter) is about 55 t.

A rough estimate is that the mass of the blades and hub in a 40 MW sea-mixer turbine of 70 m diameter may be ~250 t, though one can imagine their mass being half that or twice that. Assuming this mass is 250 t, if the middle bearing on the vertical drive shaft were omitted and the distance from the lower bearing to the hub were 20 m, the loaded cantilever mode on the extended portion of the shaft (pivot at the lower bearing) could be near 0.8 Hz (though it depends in a complex way on blade details) and thus strongly driven by the blade interaction frequency. Having the middle bearing present strongly suppresses modes involving drive-shaft pivot at the lower bearing. With the middle bearing present, the lowest modes will be at least several times higher, and they can be further increased by increasing the diameter of the shaft below the lower bearing, possibly to 3 m or more. In so doing the lowest modes can readily be kept above the fourth harmonic of the blade interaction frequency, which should be sufficient to insure the needed stability.

Positioning the lower bearings below the draft of the ship significantly complicates final ship-building operations. With sufficient shaft diameters, two bearings on the vertical drive shafts below the gear boxes, and the bearings in the speed reduction gear boxes, it should be possible to avoid having the lower bearing positioned below the bottom of the ship, even with the mixer propellers as much as 25 m below the lower bearing. If the mixer propellers are less than 5 m below the bottom of the ship, the middle bearings on the vertical drive shafts may not be needed. However, plume generation efficiency will be better if the mixer propellers are more than 10 m below the bottom of the ship.

Example Practical Embodiments. The most practical way to end Atlantic cyclone genesis and intensification would be to begin by converting retiring Nimitz-class carriers to Sea Quadcopters. If such a ship (without having its maximum available shaft power upgraded) uses about 80% of its power to drive the mixer propellers (and 10% for other general purposes such as air conditioning, kitchen, etc.), it would still have the power needed to cruise at over 25 km/hr (7 m/s, about 14 knots), as the required propulsion power is cubic with speed. If cruising at 15 km/hr, it could traverse the 100 longitudinal span of the critical zone south of the Cape Verde Islands in 3 days, producing a trail of cooled surface waters several hundred meters wide. Its return path could be 500 meters further south or north of a previous path.

While it would take 9 years for a single ship to cover the entire Cape Verde critical zone at 500-m path spacing if cruising at 15 km/hr, by focusing on the areas with highest cyclone genesis index first (high SST, low atmospheric shear, high humidity up to the mid troposphere) it should be possible with just one Nimitz-class Sea Quadcopter to significantly reduce genesis of damaging cyclones within a few years after beginning operation. The initial sea mixing is also likely to be more effective in regions where the MLD is shallow, as that will permit higher cruising speeds for a given amount of surface cooling. The sea surface current in this critical zone (a transition between the Canary current and the North Equatorial) flows generally southwest at ~10 cm/s, and that also might influence the initial optimum path pattern.

Destructive Atlantic cyclones have also originated off the northeastern coast of Venezuela, in the Caribbean sea, the GOM, and elsewhere across the tropical Atlantic, usually between 11° N and 16° N. Most of these are less intense when they make landfall, as they have a much shorter path over which to intensify before making landfall. Ending all destructive Atlantic cyclones will require more sea quadcopters to cool the hot spots and reduce relative humidity in those areas. Doing so would also keep cyclones that make it into the GOM or the Caribbean from intensifying there, as mean SST there would then be much lower. Clearly, more mixer ships, preferably with more power, will be needed to achieve all the needed deep mixing.

With only 40 MW per mixer propeller, the initial plume velocity from 60-m propellers may be only 2.5 m/s, which may not be sufficient to send the plume much below 200 m depth at a reasonable cruising speed if the MLD is only 20 m because of the buoyancy head from the denser waters below the MLD. That, however, is not a problem, as even upwelling from 100 m depth when the MLD is 20 m would be more than sufficient to cool hot surface waters to well below 25° C. (as the sea temperature would initially be below 15° C. at 100 m depth). With each successive pass the MLD steadily deepens because the deeper waters are steadily warmed from the mixing and the cooler surface waters radiate less, as noted earlier, leading to more net heating. As the MLD deepens, so does the depth to which the plume penetrates.

There are 10 Nimitz-class carriers in the US fleet, and every 3 to 4 years, another is scheduled to be decommissioned (at a cost of about $1B) and replaced by a new Ford-class carrier with 260 MW of nuclear power and more advanced warfare and communications features. It may take a fleet of six to twelve retro-fitted and repurposed carriers to keep SST below 25° C. in all regions of high cyclone genesis index in the Atlantic after two decades of steadily increasing mixing. Moreover, there is strong incentive to put an end to Atlantic hurricanes as quickly as possible. Toward that end, higher shaft power is desired. The Ford-class carriers currently in production achieve 25% higher power primarily from improved optimization of the steam turbines, the condensers, and other associated equipment. The same changes could be made in repurposed Nimitz-class carriers giving them a substantial increase in their shaft power even without changing out their reactors, though that too might be warranted because of their age.

In addition to adding the mixer propellers and their associated drive shafts, gears, support structures, and control systems, substantial changes in the drive trains to the propulsion propellers on a repurposed carrier will be required, as it would be desirable to operate the mixer turbines continuously at maximum available power while having independent control over the power going to the propulsion propellers. The preferred way to achieve that would probably be to disengage the main steam turbines from the propulsion propellers when the mixer propellers are being driven and engage electric motors to drive the propulsion propellers.

The 64 MWe of electrical power available in Nimitz-class carriers would be sufficient, as it should require only ~20 MW to propel the ship at 25 km/hr and ~40 MW to propel the ship at ~30 km/hr. If the power plant (steam turbines, condensers, etc.) of a repurposed Nimitz-class carrier is being upgraded, its electrical generating capacity could also be upgraded to perhaps something approaching the 102 MWe of Ford-class carriers. This could allow 20 MW motors on each of the propulsion propellers, which would allow the Nimitz-class carrier to cruise at up to ~50 km/hr while still applying more than half of its power to the mixer propellers.

An alternative to using electric motors to drive the propulsion propellers would be to add four additional smaller steam turbines to drive them and then control the flow of steam from the reactors to the various steam turbines. However, that would likely be less efficient and more complex.

Tropical depressions will likely continue to form until SST in regions of high cyclone genesis index have been sufficiently reduced or mid-troposphere relative humidity has been sufficiently reduced. By maintaining the option for high ship propulsion power, when a depression is beginning to form the nearest sea-mixer ships could move quickly toward its location. By executing optimum mixer paths ahead of the developing storm it might be possible to cool a portion of the surface waters feeding the storm sufficiently to shut it down. Whether or not this would often be successful in the first few years of operation remains to be seen, as the radial inflow winds feeding the developing storm often extend for more than 500 km and the mixer ships can do little to affect SST over such a large area in a short period of time.

The drag on the mixer propellers when cruising at high speeds becomes substantial, leading to high forces on the bearings supporting the vertical drive shafts, but such forces would still be about two orders of magnitude below the dynamic load limit of available spherical roller bearings for example, which go beyond 3E7 N. In the figures the supports to the lower bearings are shown slightly above the bottom of the ship's hull so that they do not add to the ship's draft when the mixer propellers and lower portions of the vertical drive shafts are removed. They could be positioned lower to reduce stresses on the bearings, but that would complicate compatibility with drydocks and is not necessary.

As Ford-class carriers will continue to be in production for decades, a logical plan would be to accelerate the planned replacement rate of Nimitz-class carriers (modernize the carrier fleet more quickly) and outfit these carriers with larger reactors and more efficient turbines in addition to adding the other needed features for deep sea mixing, as disclosed in the instant invention. The cost of doing so is not likely to be significantly more than the expected decommissioning cost, which then could be deferred for many decades.

To address regions of high cyclone genesis index outside the Atlantic, a few dozen additional nuclear-powered sea multicopters would be needed, and such would preferably have significantly more shaft power, possibly as much as 800 MW, with more or larger mixer propellers.

If the mixer propellers are all at the same depth and the pairs are at the same z location, as portrayed in the figures, the mounting becomes more complicated if their diameters exceed about 70 m on carriers of current dimensions, as the gear boxes would need to extend beyond the edge of the flight deck for the propellers to avoid interfering. Larger propellers could be used without that complication if they were at different depths or at staggered (off-set) x locations. An alternative would be to have 6, 8, or even more mixer propellers of smaller diameters, with a corresponding number of steam turbines and appropriate drive trains. Having a larger number of mixer propellers means each operates at lower torque, which reduces manufacturing difficulties in the gear boxes.

Some additional expected effects of deep mixing. The reduced SST from the sea mixing also cools the atmosphere above it, increasing its density. If the cooled surface is sufficiently large (perhaps a patch 50 km across) turbulence can extend this atmospheric cooling well beyond the atmospheric boundary layer. While the amount of initial atmospheric cooling above the cooled patch may be limited by enthalpy from condensing moisture (raining), the increased density will still cause convection-driven downward flow, followed by outward flow in the atmospheric boundary layer over and beyond the cooled patch. When the outflow gets sufficiently beyond the cooled patch, it becomes warmed back to the SST there and nearly saturated. This lower density air then ascends, cools, and rains. The cool dry upper air flows back to the center of the cell above the cooled patch (cyclonically, being inward flow) and descends, completing the cycle.

The engine driving normal tropical cyclones operates between the SST near its core and a cooler temperature that is somewhere between SST at the remote edges of the cyclone and the temperature in the mid troposphere. The engine driving this anticyclonic cell is much smaller and operates between the SSTs at its edge and its center. Hence, it is of much lower efficiency, so its wind velocities would be much lower. However, the difference in SST from the center of the cell to its edge could well exceed 5° C., which is more than that driving many tropical thunderstorms. This is sufficient for the cell circulation to build to the upper troposphere. The descending central air, though warmed by compression as it descends, will be very dry, so the out-flowing anticyclonic dry surface air could further cool the cooled surface patch as it picks up moisture, though this would partly be offset by viscous heating. The cool patches would slowly warm over time because of reduced long-wave radiation, but the details of how such cool patches and their anticyclonic cells evolve in time is as of yet unknown.

The anticyclonic vorticity from such a cell could be sufficient to significantly reduce cyclone genesis at distances well beyond the regions of cooled SSTs. Hence, it is possible that a small number of patches of cool sea surface, each under 50 km square at strategic locations in the primary critical zone and several other critical zones, could rather quickly stop genesis of damaging cyclones in the Atlantic.

CITATION LIST

Kerry Emanuel, "100 Years of Progress in Tropical Cyclone Research", Meterorological Monographs, Vol 59, 15.1-15.68, doi: 10.1175/AMSMONOGRAPHS-D-18-0016.1 2018.

https://coralreefwatch.noaa.gov/product/5 km/index.php https://www.trackthetropics.com/hurricane-season-statis-tics/ https://www.ewoce.org/gallery/eWOCE_Tables.html#Atlantic

Montegut, CdB, Madec G, Fischer A S, Lazar A, Iudicone D, "Mixed layer depth over the global ocean: An examination of profile data and a profile-based climatology", J Geophys. Research Vol 109, C12003, doi:1029/2004JC002378, 2004. https://www7320.nrlssc.navy.mil/nmld/mixedlayerdepth.html Barber, GL, U.S. Pat. No. 7,536,967, Marine Water Conversion System, 2009.

https://globalwindatlas.info/ https://www.e-education.psu.edu/earth103/node/1007

Assaf G, Bronicki LY, U.S. Pat. No. 5,492,274, Method of and means for Weather Modification, 1996.

Kitamura K, U.S. Pat. No. 7,832,657, Apparatus for Lowering Water Temperature of Sea Surface, 2010.

Sirovich L, U.S. Pat. No. 8,262,314, Method for decreasing the intensity and frequency of tropical storms or hurricanes, 2012.

Bowers J A, Gates W et al, U.S. Pat. No. 8,685,254, Water Alteration Structure Applications and Methods, 2014.

Solc J, U.S. Pat. No. 7,798,419, Method of and a device for the reduction of tropical cyclones destructive force, 2010.

Orridge S J, U.S. Pat. No. 9,624,917, Hurricane dissipation system and method, 2017.

Rosen A, U.S. Pat. No. 9,736,996, Processes and Apparatus for reducing the intensity of tropical cyclones, 2017.

Liu M, Tanhua T, "Water masses in the Atlantic Ocean: characteristics and distributions", Ocean Science, 17, 463-486, 2021, doi.org/10.5194/02-17-463-2021.

https://earth.nullschool.net/#current/wind/surface/level/equirectangular-58.08,9.15, 470/loc=−23.627,12.767 https://en.wikipedia.org/wiki/Nimitz-class_aircraft_carrier https://oceancurrents.rsmas.miami.edu/atlantic/canary.html Lobner P, Marine Nuclear Power, 2018, https://lynceans.org/wp-content/uploads/2018/07/Marine-Nuclear-Power-1939-2018_P art-2B_USA_surface-ships.pdf https://en.wikipedia.org/wiki/USS_Gerald_R._Ford https://www.world-nuclear.org/information-library/non-power-nuclear-applications/t ransport/nuclear-powered-ships.aspx https://en.wikipedia.org/wiki/Upwelling Corliss J J, U.S. Pat. No. 5,989,082, Propulsion System for Large Ships, 1999.

The invention claimed is:

1. A nuclear-powered sea-mixer ship for inducing mixing of ocean surface waters with deep waters, said ship comprising:
   a plurality of steam turbines,
   a plurality of downward-directed mixer propellers mounted on multiple sides to the ship,
   a plurality of drive trains, each drive train of the plurality of drive trains comprising a high speed drive shaft, speed reduction gears, and a high torque vertical drive shaft for coupling power from a steam turbine of the plurality of steam turbines to a mixer propeller of the plurality of mixer propellers,
   said mixer propellers are configured to be driven by the plurality of high-torque vertical shafts such that a net torque in the vertical drive shafts is less than a largest torque applied to any single mixer propeller.

2. The ship of claim 1 in which at least two of said mixer propellers are further characterized as having diameters greater than 20 m.

3. The ship of claim 1 in which said mixer propellers are further characterized as having ratio of mean pitch to diameter less than 0.5.

4. The ship of claim 1 further characterized as having multiple rearward directed propulsion propellers and means for driving said propulsion propellers at rotational rates that are independent of the rotational rates of said mixer propellers.

5. The ship of claim 1 in which said turbines are further characterized as having combined shaft power greater than 100 MW.

6. The ship of claim 1 further characterized as having a landing deck sufficient to accommodate small winged aircraft.

7. The ship of claim 1 in which said plurality of mixer propellers is further characterized as being an even number.

8. The ship of claim 1 in which said drive train is further characterized as including a clutch, said ship is further characterized as having a control system capable of separately adjusting the amount of steam applied to each said turbine in response to control signals, said control system further characterized as being capable of quickly disengaging the clutch in said drive train in response to control signals.

9. The ship of claim 1 wherein the plurality of steam turbines comprises four steam turbines, each steam turbine is coupled to the mixer propeller through the drive chain that further includes a clutch.

10. The ship of claim 1 in which said high-torque vertical drive shaft is further characterized as being supported by a plurality of bearings between said mixer propeller and said speed reduction gears.

11. The ship of claim 9 further characterized as being a re-purposed Nimitz-class aircraft carrier and having one clockwise driven propeller on each side and one counter-clockwise driven propeller on each side.

12. A method of cooling surface sea waters by utilizing a nuclear-powered sea-mixer ship for inducing upwelling of deep waters by driving a large-diameter low-velocity plume of surface sea waters downward, said method further characterized as utilizing an even number of subsurface downward-directed mixer propellers attached on multiple sides to the ship and driven by drive shafts and gearing coupling the ship's power to the mixer propellers.

\* \* \* \* \*